United States Patent
Burgess

(10) Patent No.: US 6,812,844 B1
(45) Date of Patent: Nov. 2, 2004

(54) CHILD SAFETY SEAT WITH ALARM

(76) Inventor: Marty G. Burgess, 4264 Flat Creek Rd., Heath Spring, SC (US) 29058

( * ) Notice: Subject to any disclaimer, the term of this patent is extended or adjusted under 35 U.S.C. 154(b) by 108 days.

(21) Appl. No.: 10/184,828

(22) Filed: Jun. 28, 2002

(51) Int. Cl.$^7$ .............................................. G08B 23/00
(52) U.S. Cl. .................... 340/573.1; 340/457; 340/611; 180/273
(58) Field of Search ........................... 340/573.1, 573.4, 340/457, 426.28, 457.1, 500, 593, 611, 636.1, 692, 667; 180/273; 280/735, 730.1; 701/45, 46, 47, 49

(56) References Cited

U.S. PATENT DOCUMENTS

| | | | | |
|---|---|---|---|---|
| 5,260,684 A | * | 11/1993 | Metzmaker | 340/457.1 |
| 5,581,234 A | * | 12/1996 | Emery et al. | 340/457.1 |
| 5,793,291 A | * | 8/1998 | Thornton | 340/573.1 |
| 5,924,055 A | * | 7/1999 | Hattori | 702/138 |
| 6,104,293 A | * | 8/2000 | Rossi | 340/573.1 |
| 6,204,767 B1 | * | 3/2001 | Sparks | 340/573.1 |
| 6,445,301 B1 | * | 9/2002 | Farrell et al. | 340/573.2 |
| 6,535,137 B1 | * | 3/2003 | Ryan | 340/687 |

* cited by examiner

Primary Examiner—Benjamin C. Lee
Assistant Examiner—Phung Nguyen

(57) ABSTRACT

Child safety seats with alarms notify the driver of a vehicle that an infant is in its carrier inside of the vehicle when a door is opened. Forgetting a child inside of the vehicle can result in severe injury to or the death of the child from extreme temperature conditions and/or dehydration. Child safety seats with alarms not only protect the child in the event of accident, but also detect the opening of a vehicle door and remind the driver of the presence of the child through visual and audio alerts. The detector and alarm system are automatically engaged when the buckle of the child safety seat is closed. The condition of the batteries powering the detector and alarm system are also monitored so that the user can be confident that the detector and alarm system have adequate power to function. A pressure transducer is employed as a detector to sense the changing air pressure caused by the opening or closure of a vehicle door. When such a condition is detected, red LEDs light up and an alarm is sounded from a speaker.

19 Claims, 2 Drawing Sheets

CHILD SAFETY SEAT WITH ALARM

BACKGROUND OF THE INVENTION

1. Field of the Invention

The present invention relates to a child safety seat with alarm for use in connection with transporting infants in vehicles. The child safety seat with alarm has particular utility in connection with notifying the driver of a vehicle that an infant is in its carrier inside of the vehicle when a door is opened.

2. Description of the Prior Art

Child safety seats with alarms are desirable for notifying the driver of a vehicle that an infant is in its carrier inside of the vehicle when a door is opened. Children frequently fall asleep when being transported in vehicles. As a result, it is possible for a driver to forget that they are transporting a child if the baby remains quiet for a long period of time. Forgetting a child inside of a vehicle can result in severe injury to or the death of the child from extreme temperature conditions and/or dehydration. Child safety seats with alarms not only protect the child in the event of accident, but also detect the opening of a vehicle door and remind the driver of the presence of the child through visual and audio alerts. The detector and alarm system are automatically engaged when the buckle of the child safety seat is closed. The condition of the batteries powering the detector and alarm system are also monitored so that the user can be confident that the detector and alarm system have adequate power to function.

The use of child alert systems for automobiles is known in the prior art. For example, U.S. Pat. No. 5,793,291 to Thornton discloses a child alert system for automobiles. However, the Thornton '291 patent does not have a pressure transducer, and has further drawbacks of not sounding an alarm until a potentially dangerous temperature has already been reached inside of the vehicle.

U.S. Pat. No. 6,104,283 to Rossi discloses a warning system for detecting presence of the child in an infant seat that detects the state of the vehicle's ignition system. However, the Rossi '283 patent does not have a pressure transducer, and additionally does not have a buckle switch.

Similarly, U.S. Pat. No. 5,966,070 to Thornton discloses a child alert alarm for automobiles that detects the presence of a child locked within a parked automobile during extreme temperatures. However, the Thornton '070 patent does not have a pressure transducer, and cannot sound an alarm until a potentially dangerous temperature has already been reached inside of the vehicle.

In addition, U.S. Pat. No. 5,581,234 to Emery et al. discloses an infant vehicle seat alarm system that produces an audible or visual warning when the seat/carrier component is initially aligned on the base component, not locked onto the base component, or when the harness is in an unused state. However, the Emery et al. '234 patent does not have a pressure transducer, and also does not alert the driver to the presence of an infant when a vehicle door is opened.

Furthermore, U.S. Pat. No. 6,028,509 to Rice discloses a voice-activated vehicle alarm system that generates an output signal in response to signals from a temperature sensor and a sound detector. However, the Rice '509 patent does not have a pressure transducer, and further lacks the ability to sound an alarm until a potentially dangerous temperature has already been reached inside of the vehicle.

Lastly, U.S. Pat. No. Des. 306,099 to Kassai discloses a child's safety seat for an automobile. However, the Kassai '099 patent does not have a pressure transducer, and has the additional deficiency of not generating an alarm when a vehicle door is opened.

While the above-described devices fulfill their respective, particular objectives and requirements, the aforementioned patents do not describe a child safety seat with alarm that allows notifying the driver of the vehicle that an infant is in its carrier inside of the vehicle when a door is opened. The Thornton '291 patent, the Thornton '070 patent, and the Rice '509 patent make no provision for a pressure transducer, and further lacks the ability to sound an alarm until a potentially dangerous temperature has already been reached inside of the vehicle. The Rossi '283 patent, the Emery et al. '234 patent, and the Kassai '099 patent also lack a pressure transducer. Additionally, the Rossi '283 patent does not have a buckle switch, and the Emery et al. '234 patent and the Kassai '099 patent cannot alert the driver to the presence of an infant when a vehicle door is opened.

Therefore, a need exists for a new and improved child safety seat with alarm that can be used for notifying the driver of the vehicle that an infant is in its carrier inside of the vehicle when a door is opened. In this regard, the present invention substantially fulfills this need. In this respect, the child safety seat with alarm according to the present invention substantially departs from the conventional concepts and designs of the prior art, and in doing so provides an apparatus primarily developed for the purpose of notifying the driver of the vehicle that an infant is in its carrier inside of the vehicle when a door is opened.

SUMMARY OF THE INVENTION

In view of the foregoing disadvantages inherent in the known types of child alert systems for automobiles now present in the prior art, the present invention provides an improved child safety seat with alarm, and overcomes the above-mentioned disadvantages and drawbacks of the prior art. As such, the general purpose of the present invention, which will be described subsequently in greater detail, is to provide a new and improved child safety seat with alarm which has all the advantages of the prior art mentioned heretofore and many novel features that result in a child safety seat with alarm which is not anticipated, rendered obvious, suggested, or even implied by the prior art, either alone or in any combination thereof.

To attain this, the present invention essentially comprises a child safety seat having a buckle with a hollow housing mounted to the top of the child safety seat. The hollow housing encloses a detector and has an alarm attached to the housing's exterior. A power source is mounted inside the child safety seat. A switch is attached to the child safety seat as well. Battery wires connect the power source to the switch. Switch wires connect the switch to the detector. Light wires connect the detector to the alarm.

There has thus been outlined, rather broadly, the more important features of the invention in order that the detailed description thereof that follows may be better understood and in order that the present contribution to the art may be better appreciated.

The invention may also include a speaker and lights comprising the alarm. The power source may consist of four AA batteries. The detector may take the form of a pressure transducer. A device to monitor the status of the power source and alert the user of a problem with the power source may be employed. The switch may be attached to the buckle to monitor the closure status of the buckle. The power source may be contained within a battery compartment having a hingedly attached lid. There are, of course, additional features of the invention that will be described hereinafter and which will form the subject matter of the claims attached.

Numerous objects, features and advantages of the present invention will be readily apparent to those of ordinary skill in the art upon a reading of the following detailed description of presently current, but nonetheless illustrative, embodiments of the present invention when taken in conjunction with the accompanying drawings. In this respect, before explaining the current embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved child safety seat with alarm that has all of the advantages of the prior art child alert systems for automobiles and none of the disadvantages.

It is another object of the present invention to provide a new and improved child safety seat with alarm that may be easily and efficiently manufactured and marketed.

An even further object of the present invention is to provide a new and improved child safety seat with alarm that has a low cost of manufacture with regard to both materials and labor, and which accordingly is then susceptible of low prices of sale to the consuming public, thereby making such child safety seat with alarm economically available to the buying public.

Still another object of the present invention is to provide a new child safety seat with alarm that provides in the apparatuses and methods of the prior art some of the advantages thereof, while simultaneously overcoming some of the disadvantages normally associated therewith.

Even still another object of the present invention is to provide a child safety seat with alarm for notifying the driver of the vehicle that an infant is in its carrier inside of the vehicle when a door is opened. This allows the detector and alarm to be automatically activated whenever the buckle is closed.

Still yet another object of the present invention is to provide a child safety seat with alarm for notifying the driver of the vehicle that an infant is in its carrier inside of the vehicle when a door is opened. This makes it possible to alert the driver to the presence of an infant whenever a vehicle door is opened.

An additional object of the present invention is to provide a child safety seat with alarm for notifying the driver of the vehicle that an infant is in its carrier inside of the vehicle when a door is opened. This ensures that the user is aware of any problems with the power source.

A further object of the present invention is to provide a child safety seat with alarm for notifying the driver of the vehicle that an infant is in its carrier inside of the vehicle when a door is opened. This provides both audible and visual alerts.

Lastly, it is an object of the present invention to provide a new and improved child safety seat with alarm for notifying the driver of the vehicle that an infant is in its carrier inside of the vehicle when a door is opened.

These together with other objects of the invention, along with the various features of novelty that characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated current embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts throughout the various figures.

DESCRIPTION OF THE CURRENT EMBODIMENT

Figure 1:
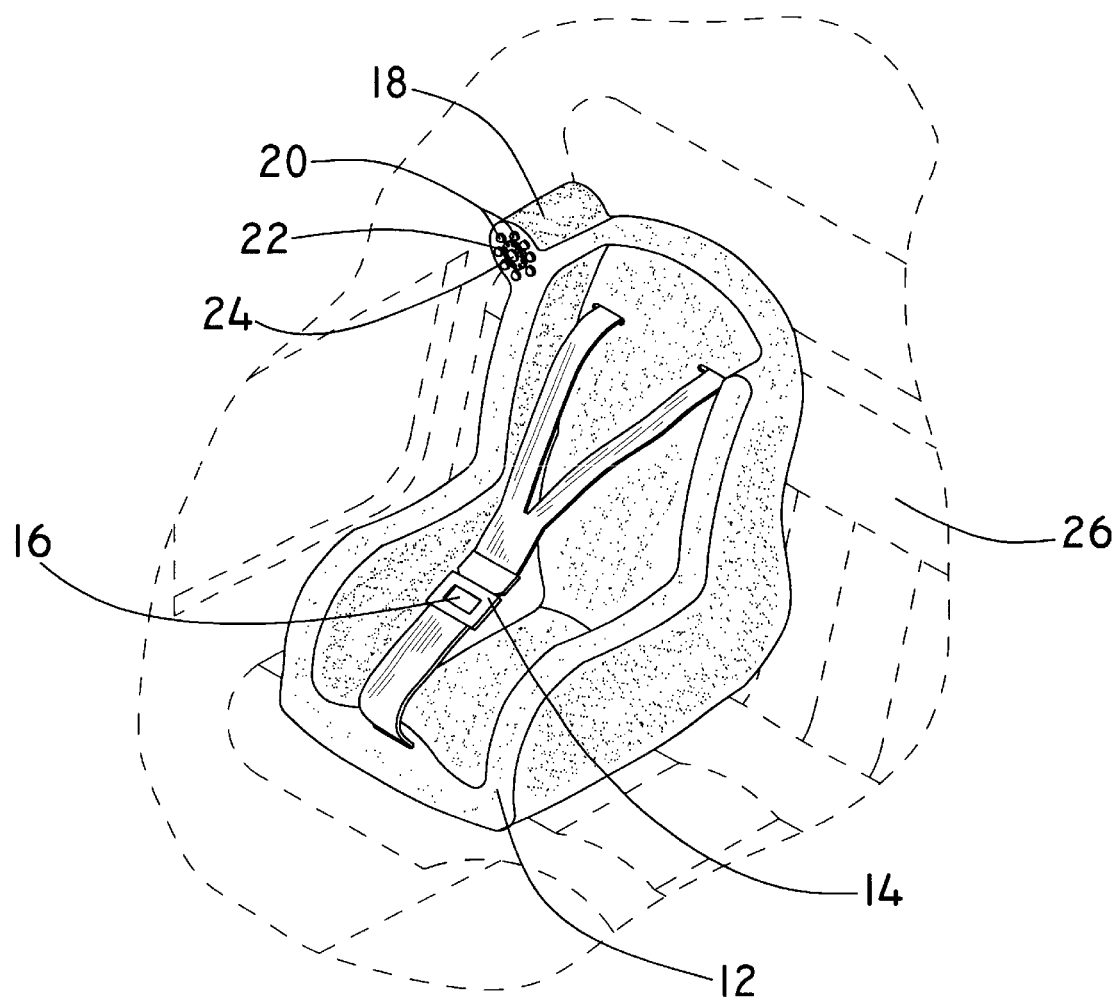
FIG. 1 is a top perspective view of the current embodiment of the child safety seat with alarm constructed in accordance with the principles of the present invention.

Referring now to the drawings, and particularly to FIGS. 1-4, a current embodiment of the child safety seat with alarm of the present invention is shown and generally designated by the reference numeral 10.

In FIG. 1, a new and improved child safety seat with alarm 10 of the present invention for notifying the driver of the vehicle that an infant is in its carrier inside of the vehicle when a door is opened is illustrated and will be described. More particularly, the child safety seat with alarm 10 has a child safety seat 12 in place on a vehicle seat 26. Buckle 14 is shown in a closed position, thereby closing switch 16. Attached to the top corner of the child safety seat 12 is hollow housing 18. On the front face of housing 18 are attached lights 20, pressure transducer 22, and speaker 24. In the current embodiment, lights 20 are red LEDs, and housing 18 is made of plastic. Switch 16 monitors the closure state of buckle 14. When buckle 14 is closed, pressure transducer 22 is activated. Upon a change in air pressure generated by the opening or closing of a vehicle door, pressure transducer 22 generates a signal which activates lights 20 and speaker 24 to alert the driver to the presence of an infant in vehicle seat 26. Note that the broken lines illustrating vehicle seat 26 are for illustrative purposes only and are not part of the current invention.

Figure 2:
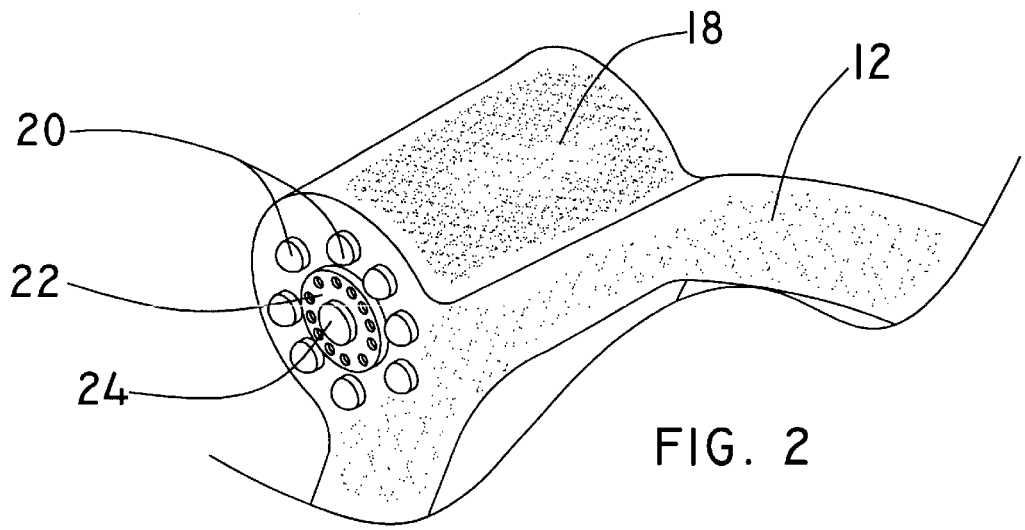
FIG. 2 is a top perspective view of the housing of the present invention.

Moving on to FIG. 2, a new and improved housing 18 of the present invention for notifying the driver of the vehicle that an infant is in its carrier inside of the vehicle when a door is opened is illustrated and will be described. More particularly, the housing 18 is attached to the top corner of child safety seat 12. The front face of pressure transducer 22 is shown, with its body enclosed by housing 18. Attached to the front face of housing 18 are lights 20 and speaker 24.

Figure 3:
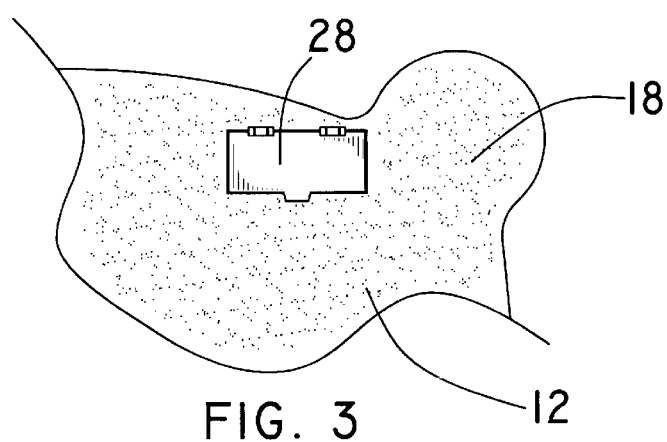
FIG. 3 is a top side view of the lid of the present invention.

Continuing with FIG. 3, a new and improved lid 28 of the present invention for notifying the driver of the vehicle that an infant is in its carrier inside of the vehicle when a door is opened is illustrated and will be described. More particularly, the lid 28 is hingedly attached to the backside of child safety seat 12. Housing 18 is also shown.

Figure 4:
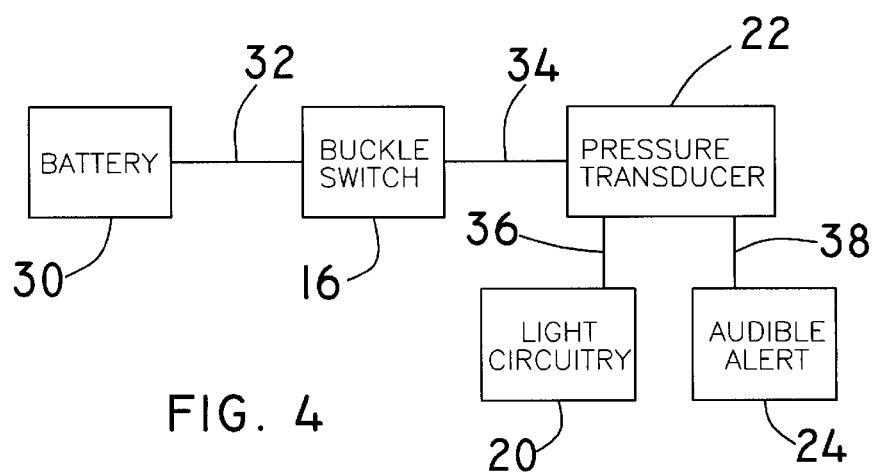
FIG. 4 is a block diagram view of the electrical components of the present invention.

Concluding with FIG. 4, the new and improved electrical components of the present invention for notifying the driver of the vehicle that an infant is in its carrier inside of the vehicle when a door is opened are illustrated and will be described. More particularly, the four AA batteries 30 are connected to switch 16 mounted in buckle 14 (not shown) by battery wires 32. Switch wires 34 in turn connect pressure transducer 22 with switch 16. Light wires 36 connect lights 20 to pressure transducer 22, and speaker wires 38 connect speaker 24 with pressure transducer 22. The closure of switch 16 allows electrical current to pass from the four AA batteries 30 along battery wires 32 through switch 16 to switch wires 34 and pressure transducer 22. Once pressure transducer 22 detects a change in air pressure, electrical current passes along light wires 36 and speaker wires 38 to activate lights 20 and speaker 24.

While a current embodiment of the child safety seat with alarm has been described in detail, it should be apparent that modifications and variations thereto are possible, all of which fall within the true spirit and scope of the invention. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention. For example, any suitable power source such as alternative types of batteries or a connection to the vehicle's wiring harness may be used instead of the four AA batteries described. Also, the plastic housing may also be made of steel, aluminum, titanium, or carbon fiber composite. Furthermore, a wide variety of audible and visual signals may be used instead of the red LEDs and speaker described.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A child safety seat with alarm comprising:
   a child safety seat having a buckle and a top;
   a power source enclosed by said child safety seat;
   a switch attached to said child safety seat;
   a plurality of battery wires having opposing ends with one end attached to said power source and said opposing end attached to said switch;
   a hollow housing having an exterior face attached to said top of said child safety seat;
   a car door status detector enclosed within said housing;
   a plurality of switch wires having opposing ends with one end attached to said switch and said opposing end attached to said detector;
   an alarm attached to said housing; and
   a plurality of light wires having opposing ends with one end attached to said detector and said opposing end attached to said alarm.

2. The child safety seat with alarm as defined in claim 1, wherein said power source comprises four AA batteries.

3. The child safety seat with alarm as defined in claim 1, further comprising:
   a battery compartment, wherein said top of said child safety seat defines an indentation therein to comprise said battery compartment; and
   a lid hingedly attached to said child safety seat so as to cover said battery compartment.

4. The child safety seat with alarm as defined in claim 1, wherein said switch is mounted on said buckle in such a way so as to detect the closure state of said buckle.

5. The child safety seat with alarm as defined in claim 1, wherein said car door status detector is a pressure transducer wherein said pressure transducer is capable of detecting a change in air pressure resulting from the opening or closing of a car door.

6. The child safety seat with alarm as defined in claim 1, wherein said alarm is at least one of the group consisting of lights, buzzers, music, sirens, and a recorded message.

7. The child safety seat with alarm as defined in claim 1, wherein said housing is selected from the group consisting of plastic, steel, aluminum, titanium, and carbon fiber composite.

8. The child safety seat with alarm as defined in claim 1, wherein said alarm comprises red LEDs mounted on said exterior face of said housing.

9. The child safety seat with alarm as defined in claim 1, further comprising a power source monitor which activates said alarm should said power source fall below a predetermined voltage when said buckle is closed.

10. A child safety seat with alarm comprising:
    a child safety seat having a buckle and a top;
    a battery compartment, wherein said top of said child safety seat defines an indentation therein to comprise said battery compartment;
    a lid hingedly attached to said child safety seat so as to cover said battery compartment;
    a power source enclosed by said battery compartment;
    a switch mounted on said buckle in such a way so as to detect the closure state of said buckle;
    a plurality of battery wires having opposing ends with one end attached to said power source and said opposing end attached to said switch;
    a hollow housing having an exterior face attached to said top of said child safety seat;
    a change in air pressure detector enclosed within said housing;
    a plurality of switch wires having opposing ends with one end attached to said switch and said opposing end attached to said detector;
    an alarm attached to said housing; and
    a plurality of light wires having opposing ends with one end attached to said detector and said opposing end attached to said alarm.

11. The child safety seat with alarm as defined in claim 10, wherein said power source comprises four AA batteries.

12. The child safety seat with alarm as defined in claim 10, wherein said change in air pressure detector is a pressure transducer capable of detecting a change in air pressure resulting from the opening or closing of a car door.

13. The child safety seat with alarm as defined in claim 10, wherein said alarm is at least one of the group consisting of lights, buzzers, music, sirens, and a recorded message.

14. The child safety seat with alarm as defined in claim 10, wherein said housing is selected from the group consisting of plastic, steel, aluminum, titanium, and carbon fiber composite.

15. The child safety seat with alarm as defined in claim 10, wherein said alarm comprises a plurality of red LEDs mounted around said change in air pressure detector on said exterior face of said housing.

16. The child safety seat with alarm as defined in claim 10, further comprising a speaker mounted on said exterior face of said housing.

17. The child safety seat with alarm as defined in claim 10, further comprising a power source monitor which activates said alarm should said power source fall below a predetermined voltage.

18. In combination with a child safety seat, including a buckle and a top, the improvement which comprises:
- a battery compartment, wherein said top of said child safety seat defines an indentation therein to comprise said battery compartment;
- a lid hingedly attached to said child safety seat so as to cover said battery compartment;
- four AA batteries enclosed by said battery compartment;
- a switch mounted on said buckle in such a way so as to detect the closure state of said buckle;
- a plurality of battery wires having opposing ends with one end attached to said four AA batteries and said opposing end attached to said switch;
- a hollow housing having an exterior face attached to said top of said child safety seat;
- a pressure transducer enclosed within said housing, wherein said pressure transducer is capable of detecting a change in air pressure resulting from the opening or closing of a car door;
- a plurality of switch wires having opposing ends with one end attached to said switch and said opposing end attached to said detector;
- an alarm attached to said exterior face of said housing;
- a plurality of light wires having opposing ends with one end attached to said detector and said opposing end attached to said alarm;
- a speaker attached to said exterior face of said housing; and
- speaker wires having opposing ends with one end attached to said detector and said opposing end attached to said speaker.

19. The improvement to a child safety seat as defined in claim 18, wherein said alarm is at least one of the group consisting of lights, buzzers, music, sirens, and a recorded message.

* * * * *